United States Patent [19]

Palmer

[11] Patent Number: 4,618,094
[45] Date of Patent: Oct. 21, 1986

[54] THRUST DEFLECTION

[75] Inventor: Charles R. Palmer, Nottingham, England

[73] Assignee: Rolls-Royce plc, London, England

[21] Appl. No.: 624,745

[22] Filed: Jun. 26, 1984

[30] Foreign Application Priority Data

Jul. 5, 1983 [GB] United Kingdom ............... 8318199

[51] Int. Cl.$^4$ .................. B64C 9/38; F02K 1/62
[52] U.S. Cl. .................. 239/265.37; 239/265.19;
239/503; 239/512; 60/230
[58] Field of Search .................. 239/265.29, 503, 507,
239/265.19, 265.37, 265.39, 265.33, 265.41, 512;
60/226.2, 230

[56] References Cited

U.S. PATENT DOCUMENTS

| | | | |
|---|---|---|---|
| 2,972,860 | 2/1961 | Moy | 60/230 |
| 3,984,974 | 10/1976 | Medawar et al. | 60/230 |
| 4,052,007 | 10/1977 | Willard | 239/265.29 |
| 4,147,027 | 4/1979 | Greathouse | 60/226.2 |

FOREIGN PATENT DOCUMENTS 2049580 12/1980 United Kingdom ............... 60/230

Primary Examiner—Andres Kashnikow
Assistant Examiner—Mary Beth O. Jones
Attorney, Agent, or Firm—Cushman, Darby & Cushman

[57] ABSTRACT

A gas turbine engine which is used for aircraft propulsion, is provided with a pair of thrust deflecting doors which, when deployed, deflect the exhaust gases onto some path other than axially of the engine, so as to spoil the thrust. The doors are waisted in profile. To prevent some of the exhaust gases from missing the doors, when deployed, and thus reducing their functional efficiency, plane flaps are provided on the jet pipe, which can be moved into the gas stream when the doors are deployed. The gas stream is thus constricted and so remains within the bounds of the deployed doors.

6 Claims, 6 Drawing Figures

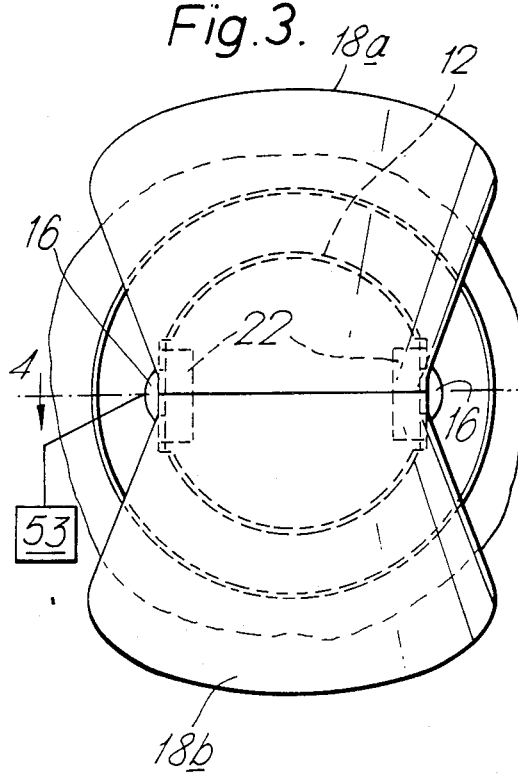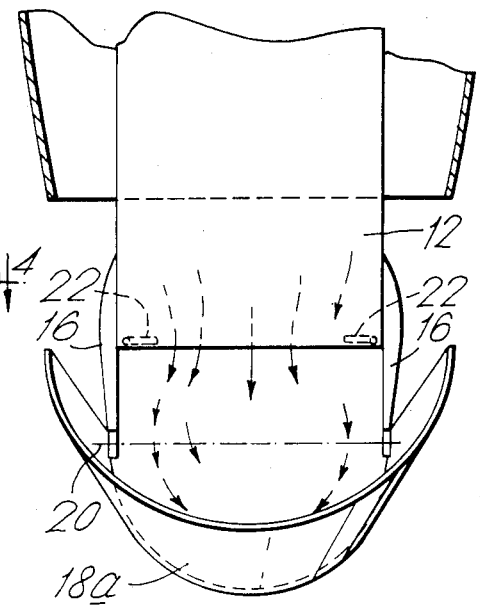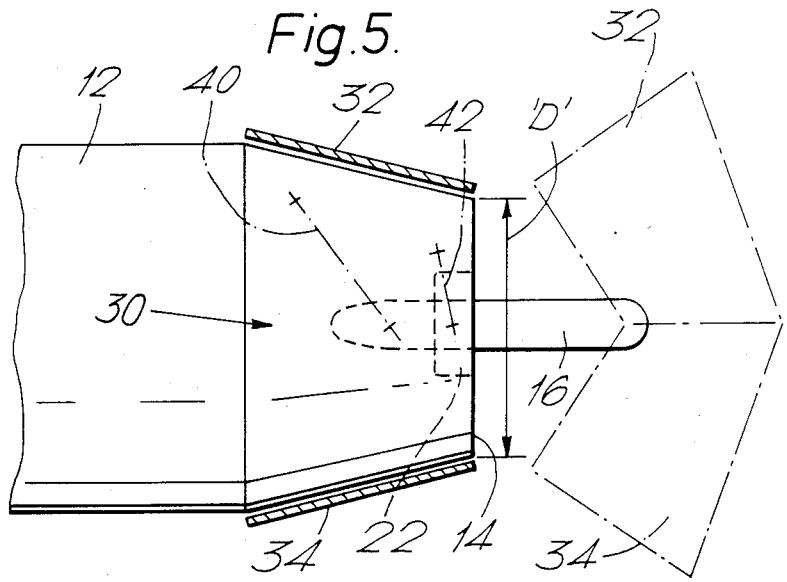

THRUST DEFLECTION

This invention relates to the deflection of thrust produced by a gas turbine engine.

More specifically, the invention relates to thrust deflection apparatus which achieves the desired result more efficiently than heretofor.

According to the present invention, a gas turbine engine jet pipe includes plane flap means pivotally mounted in the jet pipe adjacent its outlet plane for movement into and out of the gas stream, and a thrust deflector comprising a pair of doors opposed diametrically of the jet pipe, and mounted for deployment by arcuate movement in a plane normal to the pivot axis of the plane flap means, between a non thrust deflecting position and a thrust deflecting position spaced downstream from the outlet plane of the jet pipe. The plane flap means and the thrust deflection doors being adapted and constructed so as to move simultaneously into their respective positions, wherein the gas flow passing over the plane flap means is constricted so as to remain within the area covered by the deployed thrust deflector.

The jet pipe may comprise the outer one of two coaxial pipes, and which extends downstream of the inner pipe to provide the outlet plane.

The thrust deflecting doors may in their non thrust deflecting position form a downstream extension of the jet pipe.

Preferably, the thrust deflecting doors, in their non thrust deflecting position, define a gas outlet which is smaller in cross-sectional area than the cross-sectional area of the jet pipe and therefor define a throat.

Preferably the thrust deflecting doors are mounted for arcuate movement about an axis which is fixed relative to and downstream of the jet pipe outlet plane. The thrust deflecting doors may however surround the downstream end of the jet pipe in radially spaced coaxial relationship, and be connected for deployment bodily on an arcuate path to their thrust deflecting position.

The invention will now be described by way of example, and with reference to the accompanying drawings in which:

FIG. 3 is a view in the direction of arrow 3 in FIG. 2.

FIG. 4 is a view on line 4—4 of FIG. 3.

FIG. 5 is a part view of an alternative embodiment of the present invention.

It should be understood that the terms "upstream" and "downstream" as used in this specification, relate to the direction of flow of gases through the gas turbine engine of the invention.

Figure 1:
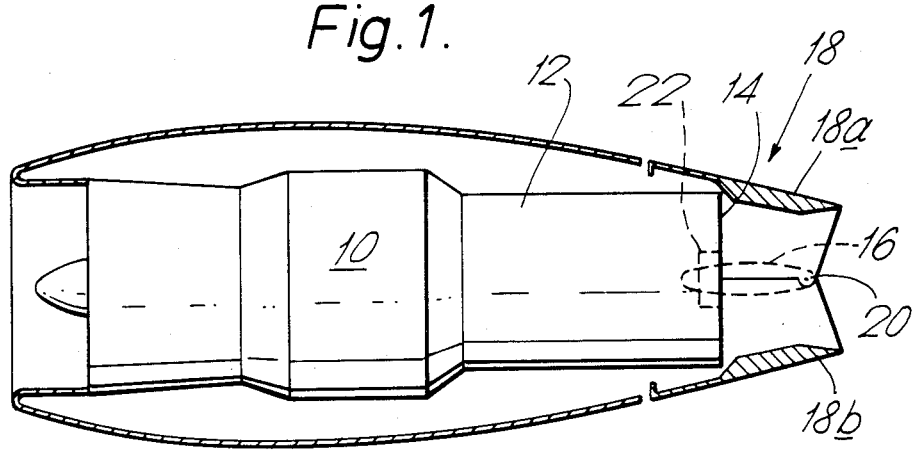
FIG. 1 is a diagrammatic view of a gas turbine engine incorporating an embodiment of the present invention.

In FIG. 1 a gas turbine engine 10 has a jet pipe 12, the outlet of which is indicated by the numeral 14. A pair of stangs 16 only one of which is shown, are each fixed by an end to the jet pipe 14, and the remainder project into space downstream thereof.

A thrust deflecting device 18 has two half round doors 18a, 18b pivotally fixed at 20, to the downstream ends of the stangs 16 and are further arranged in opposed relationship, diametrically of the jet pipe 12. Each door 18a, 18b projects forwardly over the downstream end of the jet pipe 12, when in its non thrust deflecting position.

A pair of plane flaps 22 of which only one is shown, are hinged to the inside of the downstream end of jet pipe 12, adjacent the plane of the outlet 14. The flaps 22 are arranged opposite each other diametrically of the jet pipe, and orientated such that their pivot axes are normal to the pivot axis of the deflector doors 18a, 18b.

Figure 2:
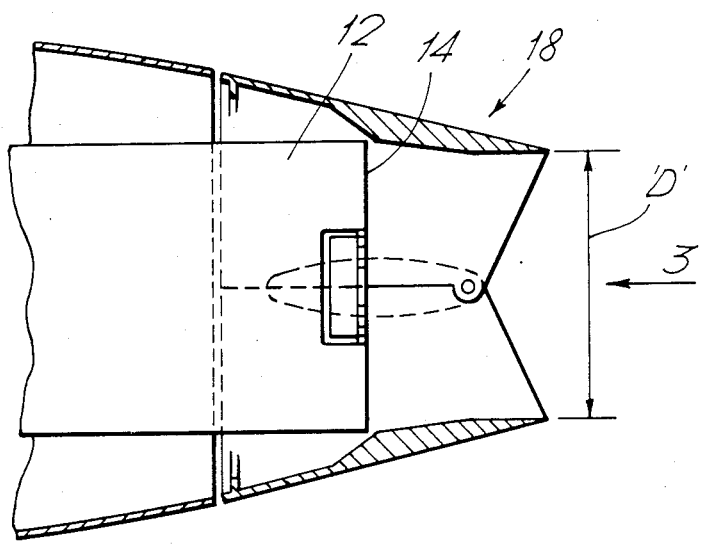
FIG. 2 is an enlarged part view of FIG. 1.

Referring now to FIG. 2. The thrust deflector 18 in the present example, is generally frusto conical in form, and the least diameter 'D' thereof is less than that of the outlet 14 of jet pipe 12. The thrust deflector 18 in its non deployed position as shown in FIGS. 1 and 2 thus provides the throat of the exhaust system of the gas turbine engine 10.

With reference to FIG. 3. The doors 18a, 18b of the thrust deflector 18 are shown deployed i.e. pivoted about fixed axis 20, such that their downstream ends abut. At the same time, the plane flaps 22 have been pivoted about their respective axes so as to project into the gas stream passing through the jet pipe 12.

It is clearly shown in FIG. 3, that when deployed, the thrust deflector 18 is waisted, by virtue of its frusto conical form when not deployed.

As can be seen in FIG. 4 however, when the flaps 22 are extended into the gas stream, they serve to constrict the flow as indicated by the arrows, rather than allow it to expand sideways on passing to atmosphere from the jet pipe outlet 14. All of the gasflow is thus directed onto the deflectors.

Referring now to FIG. 5. Jet pipe 12 terminates in a frusto conical portion 30 which forms both a throat 'D' and a gas outlet plane 14. Thrust deflector doors 32, 34 are opposed diametrically of the jet pipe 12, and totally overlap the frusto conical portion 30 thereof.

The deflector doors 32, 34 are pivotaly connected, via links 40, 42 shown diagrammatically, to the stangs 16, only one of which is shown. The links 40, 42 are in turn arranged so as to be traversable along the stangs 16, in known manner, so as to enable the deflector doors 32, 34 to be sufficiently spaced from the jet pipe 12 when in their thrust deflecting positions as shown in chain dotted lines.

A pair of plane flaps 22 of which only one is shown, are positioned in the jet pipe 12 as described hereinbefore when referring to FIGS. 1 to 4 and their function is identical. Again, the plane flaps 22 and the deflector doors 32, 34 are interconnected for simultaneous movement, by means 53, but which may be any convenient known moving and synchronising mechanisms.

As the deflector doors 32, 34 fit around the exterior of the frusto conical portion 30 of jet pipe 12, the waisted shape which is formed when the doors 32, 34 are deployed will be wider than the diameter of the outlet 14. Plane flaps 22 of smaller proportions than those used in the examples of FIGS. 1 to 4 may thus be utilised.

Figure 6:
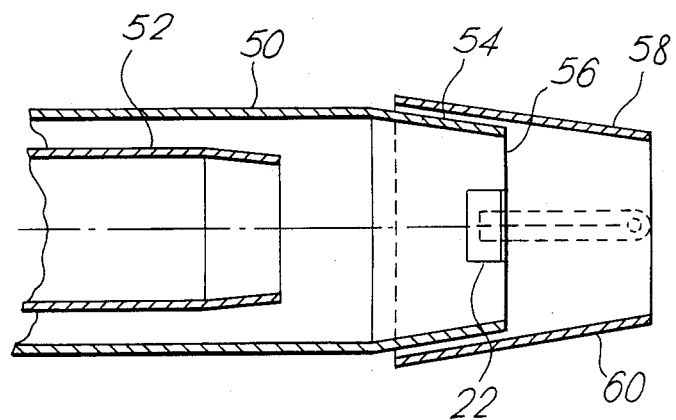
FIG. 6 is a partial diagrammatic view of a gas turbine engine incorporating an alternative embodiment of the present invention.

Referring now to FIG. 6, an outer jet pipe 50 surrounds an inner jet pipe 52 and extends beyond it to form the final nozzle 54. The outlet 56 of the final nozzle 54 has flaps 22 only one of which is seen. The flaps are pivotably mounted to the final nozzle 54 for movement into and out of the efflux flow. As described hereinbefore with reference to FIGS. 1-5 inclusive, when the thrust deflecting doors 58 and 60 are moved to their thrust deflecting position, the flaps 22 move into the efflux flow.

I claim:

1. A gas turbine engine having a jet pipe of the constant outlet opening type with a a thrust deflector movably connected thereto comprising:

a pair of deflector doors which when inoperative are positioned opposite each other diametrically of the jet pipe and being movable through arcuate paths relative to the jet pipe to further positions in which they provide said thrust deflector, said doors in said inoperative position defining a frustum of a cone and in said operative position their downstream extremities abut to define a plane which contains their pivot axis and their combined shapes providing a profile which is narrower in the middle than at its extremities; and a pair of flaps pivotally fixed to the downstream extremity of the jet pipe at positions opposite each other diametrically of the jet pipe for movement into and out of the efflux and the pivot axes of the flaps being normal to and intersecting said plane which contains the pivot axis of the deflector doors, means for normally maintaining said flaps pivoted out of the efflux and for moving said flaps into said efflux when said deflector doors are in the operative position, when moved into said efflux said flaps constricting the flow of said efflux into said deflectors.

2. A gas turbine engine jet pipe as defined in claim 1 wherein said deflector doors comprise an outer pipe surrounding a portion of said jet pipe and extending downstream of said jet pipe to provide an outlet plane.

3. A gas turbine engine jet pipe as claimed in claim 1 wherein the thrust deflecting doors when in their non thrust deflecting position, form a downstream extension of the jet pipe.

4. A gas turbine engine jet pipe as claimed in claim 3 wherein the thrust deflecting doors in their non thrust deflecting position, define a gas outlet plane which is smaller in cross-sectional area than the cross-sectional area of the jet pipe and therefor define a throat.

5. A gas turbine engine jet pipe as claimed in claim 1 wherein the thrust deflecting doors are mounted for arcuate movement about an axis which is fixed relative to and downstream of the jet pipe outlet.

6. A gas turbine engine jet pipe as claimed in claim 1 or claim 2 wherein the thrust deflecting doors surround the downstream end of the jet pipe in radially spaced coaxial relationship and are connected thereto for deployment bodily on an arcuate path, to said thrust deflecting position.

* * * * *